May 5, 1959 J. R. MILLER 2,885,106
OUTLET BOX FOR WALLBOARD
Filed Nov. 5, 1957
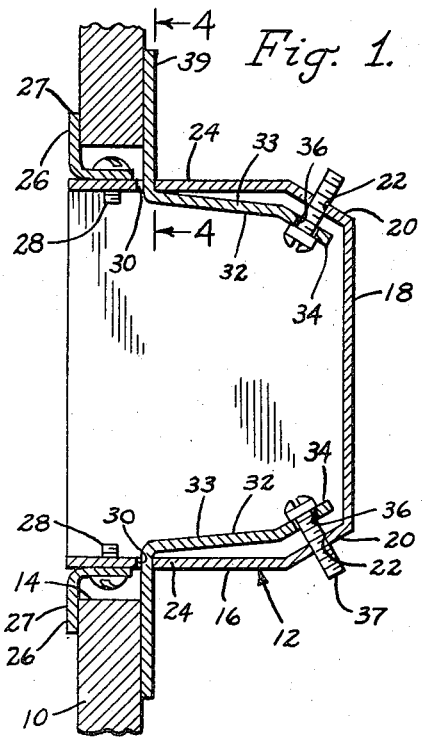
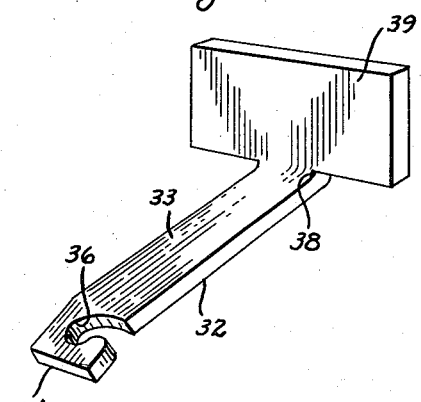
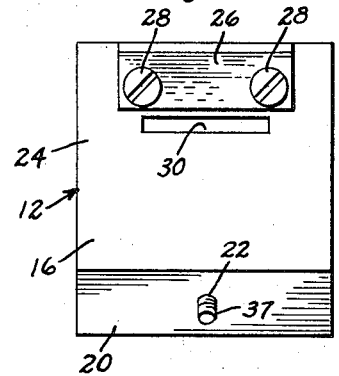
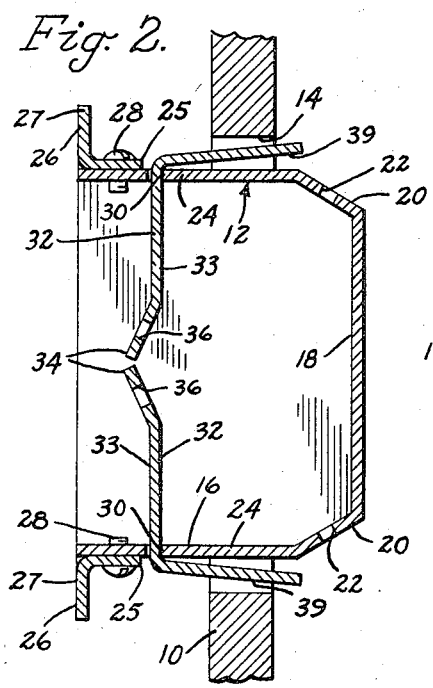
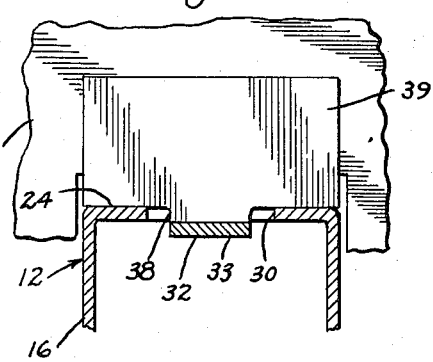
INVENTOR.
JOHN R. MILLER
BY
McMorrow, Berman & Davidson
ATTORNEYS

United States Patent Office 2,885,106
Patented May 5, 1959

2,885,106

OUTLET BOX FOR WALLBOARD

John R. Miller, Sherman, Tex.

Application November 5, 1957, Serial No. 694,617

1 Claim. (Cl. 220—3.6)

This invention relates to electrical outlet boxes and more particularly has reference to an outlet box designed for mounting in an opening formed in a relatively brittle wall material, such as plasterboard and various other types of wallboard finding increasing favor in building construction, in the erection of "dry wall" partitions and other interior walls of houses.

Hereinafter, the term "wallboard" will be used in referring to the type of wall material in which the outlet box is particularly well adapted for mounting. However, it will be understood that this term is to be considered as being used in the generic sense, to embrace all types of wall coverings in which an opening can be formed suitable for receiving an outlet box, and which have a sufficient thickness and rigidity to permit clamping engagement of the outlet box support means with the covering.

It is very difficult to mount electrical outlet boxes in wallboard, and this is due particularly to the brittle characteristics of wallboard, which is prone to chipping about the edges of an opening formed therein, cracking, etc.

It is desirable, of course, to provide means that will permit a wallboard of the type described to support an outlet box at any location desired, in view of the fact that in many instances it is desired to dispose the outlet box at a location at which it cannot be attached to a stud or similar framing member of the wall or partition.

In view of the above, the main object of the present invention is to provide a generally improved outlet box that will be particularly designed for mounting in an opening of a piece of wallboard at any desired location.

Another object is to provide an outlet box of the type described which will have an improved clamping means, especially designed to firmly grip opposed edges of the opening in which the outlet box is disposed.

Yet another object is to novelly form the clamping means in such manner as to permit it to adjust itself to different thicknesses of wallboard, while at the same time assuring a firm clamping engagement with the wallboard in every instance.

Yet another object of importance is to locate the clamping means in such a manner as not to interfere with the wires and other electrical items, such as switches, receptacles, etc., that are to be mounted within the outlet box.

A further object is to provide, in the clamping means, a construction such that movable clamp elements will normally be retracted to facilitate insertion of the outlet box in the opening, but will be swiftly adjustable to clamping positions.

Another object of importance is to so design the clamping means that should it ever be desired to remove the outlet box, the clamping means can be swiftly adjusted to releasing positions for withdrawal of the outlet box from the opening.

Other objects will appear from the following description, the claim appended thereto, and from the annexed drawing, in which like reference characters designate like parts throughout the several views, and wherein:

Figure 1 is a longitudinal sectional view through an outlet box according to the present invention, with the clamping means in gripping engagement with the wall;

Figure 2 is a view like Figure 1 in which the clamping means is in its retracted position, the outlet box being shown as it appers while it is being inserted in the opening of the wall;

Figure 3 is a top plan view of the outlet box per se with the movable clamping jaw removed;

Figure 4 is a detail sectional view substantially on line 4—4 of Figure 1; and

Figure 5 is a perspective view, on an enlarged scale, of one of the movable clamping jaws per se.

Referring to the drawing in detail, designated at 10 is a wallboard, which might be plasterboard or other type of wall surfacing material or paneling. Designated generally at 12 is the outlet box constituting the present invention, and in Figures 1 and 2 said outlet box is shown positioned within an opening 14 formed in wall 10.

The opening 14 is made slightly larger than the open front, sheet metal container portion or body 16 of the outlet box.

The body 16, in a typical arrangement, would be of rectangular configuration, and has a back wall 18 merging into diagonally extending or sloped corner portions 20 having threaded openings 22, said corner portions in turn merging into the end walls 24 of the body.

A pair of right-angularly shaped, fixed, clamping jaws 26 are secured by screws 28 to the respective end walls 24, with one leg 27 of each jaw 26 being flush with the open front of the body 16. The legs 27 are coplanar with said open front, as will be seen from Figures 1 and 2, providing for a flush mounting of the receptacle within the opening 14 (see Figure 1). The other legs 25 of the fixed jaws 26 are in face-to-face contact with the outer surfaces of the end walls 24, and have smooth-walled openings receiving the screws 28 and registering with the threaded openings of the walls 24.

In some commercial embodiments, the fixed jaws 26 would be integral with the end walls 24, that is, the fixed jaws would merely comprise outwardly directed flanges or lips integrally formed on the front edges of the walls 24 and bent outwardly to form the legs 27. In such an event, there would of course still be fixed jaws on opposite ends of the body 16, bearing against the wall 10 at opposite ends of the opening 14.

In closely spaced relation to the fixed jaws are slots 30 formed in end walls 24 and extending transversely of said end walls as shown in Figure 3. Movable, angular clamping jaws 32 are loosely pivotally engaged in the slots 30. The movable clamping jaws have inner legs 33 disposed within the container portion, said inner legs merging into distal end portions 34 which are at a wide obtuse angle to the inner legs 33.

Formed in the end portions 34 are transverse slots or openings 36, receiving connecting screws 37. Openings 36 are smoothwalled, and loosely receive the screws 37 so that the screws have a limited amount of rocking movement designed to permit the screws to remain coaxially aligned with and threadedly engaged in the openings 22, during limiting rocking movement of the movable clamping jaws to different positions.

As shown to particular advantage in Figures 4 and 5, the inner legs 33 of the movable clamping jaws are relatively narrow. At their proximal ends, they are formed with short angular extensions 38 which are of a width equal to that of the inner legs 33. Extensions 38 in turn merge into wide outer legs 39 of the movable clamping jaws. These are of substantially greater width than the inner legs 33, that is, the outer legs 39 of the movable clamping jaws are substantially greater in dimension in a direction transversely of the outlet box, than the corresponding dimensions of the inner legs. This provides a markedly increased bearing surface of the outer legs 39 against the inside faces of the wall 10.

The short extensions 38 are disposed at the juncture between the outer and inner legs 39, 33 and in a preferred embodiment the outer legs are at a slight obtuse angle to the inner legs 33, that is, legs 33, 39 are at an angle to each other slightly greater than 90 degrees. The outer legs are disposed wholly outside and the inner legs wholly inside the container portion 16, and the movable clamping jaws are mounted for free rocking movement about axes extending transversely of and disposed substantially in the plane of the end walls 24 as will be readily noted by comparison of Figures 1 and 2.

In use of the device, originally the movable clamping jaws will be swung to their Figure 2 positions. In these positions, the outer legs 39 are in closely spaced relation, and can be fully or almost fully in face-to-face contact with the end walls 24, to permit the outlet box to be positioned through the opening 14. The inner legs 33 are substantially in longitudinal alignment, extending longitudinally of the container portions 16 near the open front.

When the outlet box has been fully inserted, the legs 27 will bear firmly against the outer surface of wall 10. Then, the movable clamping jaws are rocked from their Figure 2 to their Figure 1 positions. Screws 37 are extended through openings 36 and threaded into openings 22. As the screws are threaded in a direction outwardly of the container portion 16, they tend to swing the movable clamping jaws in a direction to cause legs 39 to bear firmly against the inner surface of wall 10. Legs 33, meanwhile, are brought into close proximity to the end walls 24. Tightening of the screws 37 will increase the clamping engagement of wall 10 at opposite ends of opening 14 between the fixed and movable jaws, and of course, the space between the clamping legs of the fixed and movable jaws at each end of the outlet box may be varied without loss of the clamping actions, accommodating the clamping means to different wall thicknesses.

Should it ever be desired to remove the outlet box, one need merely retract the screws 37 out of the openings 22, which will permit the movable clamping jaws to swing back to their Figure 2 positions. This eliminates the clamping action and permits withdrawal of the outlet box.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claim.

What is claimed is:

An electrical outlet box including a back wall, opposed end walls, and opposed side walls, said box having an open front, each of said end walls including a corner portion lying at an obtuse angle both to the back wall and to the remaining portion of the end wall, said corner portions extending the full width of the end walls at the juncture thereof with the back wall, said corner portion each having a threaded opening, screws engaged in each of the openings, said end walls each including a fixed clamping jaw projecting outwardly at the front of the box so as to bear against the outer face of the wall in which the box is mounted, said end walls having transverse slots formed therein intermediate their ends, a movable clamping jaw for each of said end walls, said clamping jaws each having an outer leg and an inner leg, said outer and inner legs being integrally formed at a slightly obtuse angle relative to each other, said inner legs being disposed throughout their lengths at the interior of said box and having relatively short extensions at the proximal end portions thereof at the juncture thereof with said outer legs, said short extensions being positioned in said slots, said inner legs having distal end portions inclined at a shallow obtuse angle to the remaining portions thereof, said distal end portions being normally positioned substantially parallel to the respective corner portions adjacent thereto, said inner legs having substantially the same longitudinal dimension as the distance between said slots and said back wall, and said distal end portions having inwardly from their distal extremities transverse, curved slots each of which opens at one end upon one longitudinal edge of the distal end portion, whereby said legs are engaged with said screws and the tightening of said screws draws said inner legs into close proximity with said end walls, with the corner portions close to and substantially parallel with said distal end portions, and causes said outer legs to press against the inner surface of the wall in which the box is mounted.

References Cited in the file of this patent

UNITED STATES PATENTS

| | | |
|---|---|---|
| 2,063,923 | Gries | Dec. 15, 1936 |
| 2,233,731 | Budnick | Mar. 4, 1941 |
| 2,605,012 | Duncan | July 29, 1952 |
| 2,744,716 | Zingone | May 8, 1956 |